(12) United States Patent
Mohanty et al.

(10) Patent No.: US 12,019,502 B2
(45) Date of Patent: *Jun. 25, 2024

(54) MICROSERVICES ANOMALY DETECTION

(71) Applicant: Dell Products L.P., Round Rock, TX (US)

(72) Inventors: Bijan Kumar Mohanty, Austin, TX (US); Krunal Kanubhai Mevada, Hyderabad (IN); Vishal Agarwal, Bangalore (IN); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/828,357

(22) Filed: May 31, 2022

(65) Prior Publication Data

US 2023/0385143 A1  Nov. 30, 2023

(51) Int. Cl.
| | | |
|---|---|---|
| G06F 11/00 | (2006.01) | |
| G06F 11/07 | (2006.01) | |
| G06F 11/20 | (2006.01) | |
| G06F 18/214 | (2023.01) | |
| G06N 20/00 | (2019.01) | |

(52) U.S. Cl.
CPC ...... *G06F 11/0784* (2013.01); *G06F 11/0751* (2013.01); *G06F 11/2023* (2013.01); *G06F 11/203* (2013.01); *G06F 18/214* (2023.01); *G06N 20/00* (2019.01)

(58) Field of Classification Search
CPC ............ G06F 11/0784; G06F 11/0751; G06F 11/0757; G06F 11/076; G06F 11/2023; G06F 11/203
See application file for complete search history.

(56) References Cited

U.S. PATENT DOCUMENTS

| | | | | |
|---|---|---|---|---|
| 11,271,826 | B2* | 3/2022 | Brown | .................... G06F 11/00 |
| 11,277,317 | B2* | 3/2022 | Snyder | ............... H04L 41/5009 |
| 11,561,868 | B1* | 1/2023 | Poornachandran | ... G06F 11/202 |
| 2018/0248771 | A1* | 8/2018 | Côté | ................... H04L 41/0893 |
| 2018/0307514 | A1* | 10/2018 | Koutyrine | ........... G06F 11/0706 |

(Continued)

OTHER PUBLICATIONS

Wikipedia, "Isolation Forest," https://en.wikipedia.org/w/index.php?title=Isolation_forest&oldid=1029032059, Jun. 17, 2021, 7 pages.

(Continued)

*Primary Examiner* — Elmira Mehrmanesh
(74) *Attorney, Agent, or Firm* — Ryan, Mason & Lewis, LLP

(57) ABSTRACT

A method comprises collecting parameters corresponding to at least one microservice operation processed by a first instance of a microservice, and analyzing the parameters using one or more machine learning algorithms. Based at least in part on the analyzing, a prediction is made whether the at least one microservice operation is anomalous. In the method, the first instance of the microservice is designated as being in an anomalous state responsive to predicting that the at least one microservice operation is anomalous. One or more microservice requests for the microservice are routed to a second instance of the microservice responsive to the anomalous state designation.

20 Claims, 17 Drawing Sheets

(56) References Cited

U.S. PATENT DOCUMENTS

| | | | | |
|---|---|---|---|---|
| 2018/0349168 A1* | 12/2018 | Ahmed | ............... | G06F 11/3006 |
| 2019/0102717 A1* | 4/2019 | Wu | ....................... | H04L 41/147 |
| 2020/0097349 A1* | 3/2020 | Mahindru | ........... | G06F 11/0793 |
| 2021/0058424 A1* | 2/2021 | Chang | ................. | G06F 11/3409 |
| 2022/0050897 A1* | 2/2022 | Gaddam | ................ | G06N 3/006 |
| 2022/0164186 A1* | 5/2022 | Pamidala | .............. | G06F 9/5088 |
| 2022/0172037 A1* | 6/2022 | Kang | .................... | G06N 3/044 |

OTHER PUBLICATIONS

Jeremy H. "4 Microservices Examples: Amazon, Netflix, Uber, and Etsy," https://blog.dreamfactory.com/microservices-examples/, Jul. 14, 2021, 12 pages.

J. Lewis et al., "Microservices: A Definition of This New Architectural Term," https://martinfowler.com/articles/microservices.html, Mar. 25, 2014, 32 pages.

U.S. Appl. No. 17/502,169 filed in the name of Bijan Kumar Mohanty et al. on Oct. 15, 2021, and entitled "Application Programming Interface Anomaly Detection."

* cited by examiner

| DATE | MICROSERVICE NAME | LATENCY (milliseconds) | CONTAINER ID# | CPU UTILIZATION (%) | MEMORY UTILIZATION (%) | STORAGE UTILIZATION (%) |
|---|---|---|---|---|---|---|
| 20210218 | get_customer | 378 | 101 | 57 | 62 | 39 |
| 20210219 | get_price | 798 | 107 | 79 | 83 | 47 |
| 20210220 | update_product | 173 | 232 | 43 | 54 | 59 |

```
import numpy as np
import pandas as pd
import warnings
warnings.filterwarnings('ignore')
%matplotlib inline
import random
import matplotlib.pyplot as plt
import seaborn as sns
from sklearn.ensemble import IsolationForest
```

```
container_data = pd.read_csv('container_log_data.csv')
container_data.head(5)
```

| date | container | microservice | cpu_util | memory_util | storage_util | latency |
|---|---|---|---|---|---|---|
| 0 | 20210218 | 101 | get_customer | 54 | 62 | 47 | 307 |
| 1 | 20210218 | 102 | get_product | 46 | 67 | 38 | 278 |
| 2 | 20210218 | 103 | get_price | 38 | 64 | 52 | 198 |
| 3 | 20210218 | 104 | update_customer | 61 | 49 | 59 | 401 |
| 4 | 20210219 | 101 | get_customer | 70 | 82 | 49 | 750 |

```
from sklearn.preprocessing import LabelEncoder creating instance of LabelEncoder
labelencoder = LabelEncoder()

container_data['microservice'] = labelencoder.fit_transform(container_data['microservice'])
container_data.head()
```

```
container_data['scores'] = model.decision_function(container_data[['container', 'microservice', 'cpu_util', 'memory_util', 'storage
container_data['anomaly_score'] = model.predict(container_data[['container', 'microservice', 'cpu_util', 'memory_util', 'storage
container_data[container_data['anomaly_score']==-1].head(10)
anomaly_count = len(container_data[container_data['anomaly_score'] == -1])
anomaly_count
```

FIG. 10B

| | date | container | microservice | cpu_util | memory_util | storage_util | latency | scores | anomaly_score |
|---|---|---|---|---|---|---|---|---|---|
| 0 | 20210218 | 101 | 0 | 94 | 60 | 47 | 307 | 0.100849 | -1 |
| 1 | 20210218 | 102 | 2 | 46 | 67 | 39 | 378 | -0.000206 | -1 |
| 2 | 20210218 | 103 | 1 | 38 | 64 | 52 | 199 | 0.035949 | -1 |
| 3 | 20210218 | 104 | 3 | 61 | 49 | 53 | 461 | 0.084803 | -1 |
| 4 | 20210219 | 101 | 0 | 79 | 82 | 46 | 780 | -0.108725 | -1 |

```
accuracy = 100*list(container_data['anomaly_score']).count(-1)/(anomaly_count)
print("Accuracy of the model:", accuracy)
```

Accuracy of the model: 100.0

```
# predict using the model passing the latency of microservice and metrics of container
status = model.predict([[103, 1, 91, 73, 47, 984]])
if (status == 1):
    print("Normal container state")
elif (status == -1):
    print("Anomalous container state")
```

Anomalous container state

```
# predict using the model passing the latency of microservice and metrics of container
status = model.predict([[103, 2, 45, 93, 47, 979]])
if (status == 1):
    print("Normal container state")
elif (status == -1):
    print("Anomalous container state")
```

Normal container state

FIG. 11

MICROSERVICES ANOMALY DETECTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to management of microservices.

BACKGROUND

Enterprises with complex information technology (IT) systems rely on a multitude of software applications, which incorporate microservices to execute at least a portion of the application functions. Microservices comprise, for example, collections of loosely coupled, fine-grained and parallelized services implementing lightweight protocols. The microservices can be implemented on top of other systems and the behavior of the microservices can be directly impacted by the runtime states of the applications and associated components such as, for example, databases.

When an underlying system that hosts a microservice has issues or outages, the behavior of the microservice can be adversely impacted. Under conventional approaches, there are no systems in place to determine microservice issues in advance of their occurrence and to adequately handle microservice problems when they occur.

SUMMARY

Embodiments provide a microservices anomaly detection and resolution platform in an information processing system.

For example, in one embodiment, a method comprises collecting parameters corresponding to at least one microservice operation processed by a first instance of a microservice, and analyzing the parameters using one or more machine learning algorithms. Based at least in part on the analyzing, a prediction is made whether the at least one microservice operation is anomalous. In the method, the first instance of the microservice is designated as being in an anomalous state responsive to predicting that the at least one microservice operation is anomalous. One or more microservice requests for the microservice are routed to a second instance of the microservice responsive to the anomalous state designation.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 5 depicts example training data in an illustrative embodiment.

FIG. 6 depicts example pseudocode for importation of libraries in an illustrative embodiment.

FIG. 7A depicts example pseudocode for loading historical microservices and hosting container metrics into a data frame in an illustrative embodiment.

FIG. 7B depicts example training data in an illustrative embodiment.

FIG. 8 depicts example pseudocode for encoding training data in an illustrative embodiment.

FIG. 9 depicts example pseudocode for training an isolation forest model in an illustrative embodiment.

FIG. 10A depicts example pseudocode for computing anomaly scores using a model predict function in an illustrative embodiment.

FIG. 10B depicts example training data with anomaly scores in an illustrative embodiment.

FIG. 11 depicts example pseudocode for computing an accuracy score of the machine learning model and generating predictions for two microservice instances in different containers in an illustrative embodiment.

DETAILED DESCRIPTION

Figure 1:
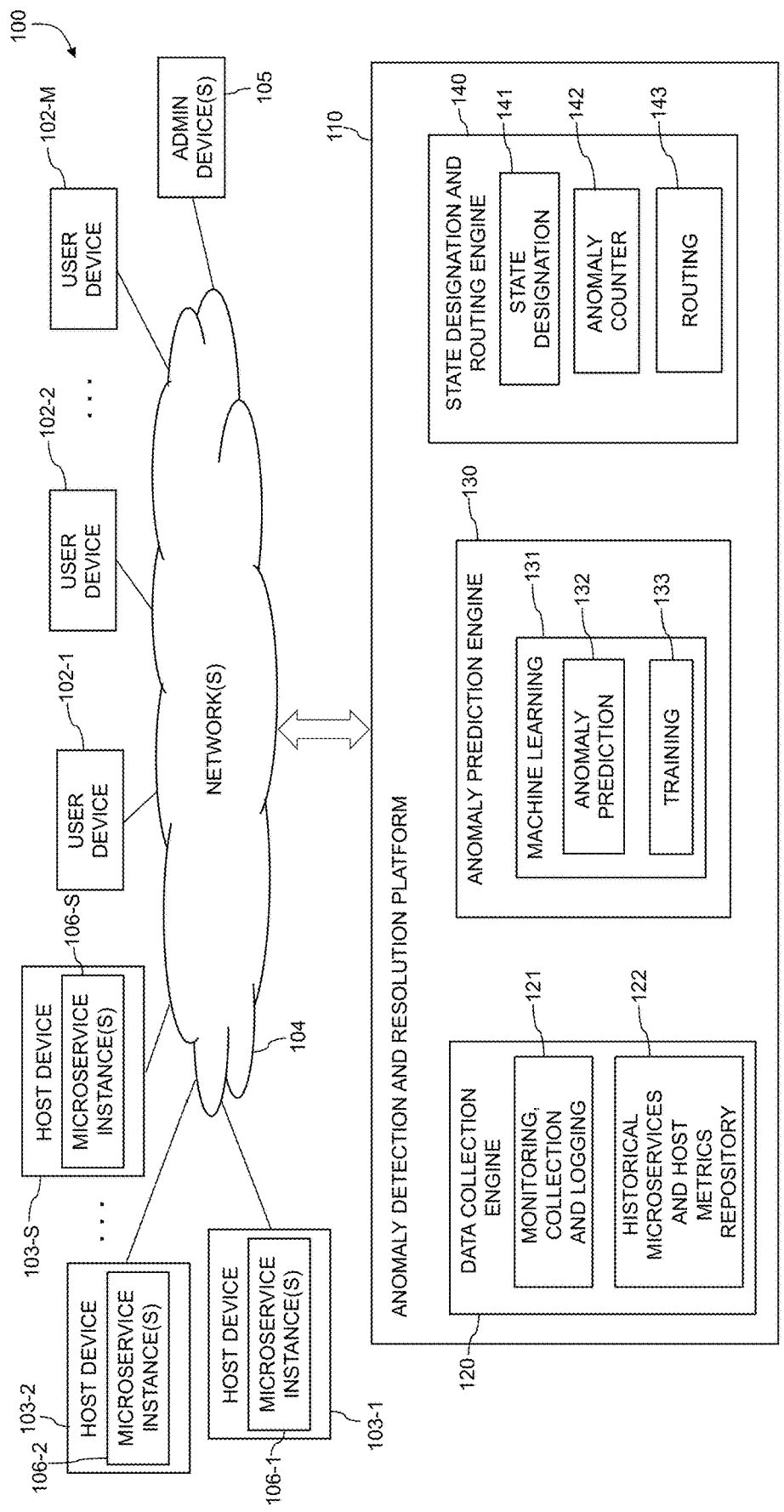
FIG. 1 depicts an information processing system with an anomaly detection and resolution platform in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "microservice" or "microservices" refers to collections of loosely coupled, fine-grained and parallelized services implementing lightweight protocols. Microservices can refer to a suite of small services for an application, with each microservice executing its own process and communicating with lightweight mechanisms that use relatively small amounts of computer resources.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment. The information processing system 100 comprises user devices 102-1, 102-2, . . . 102-M (collectively "user devices 102"), host devices 103-1, 103-2, . . . 103-S (collectively "host devices 103"), and one or more administrator devices ("Admin device(s)") 105. The user devices 102, host devices 103 and administrator devices 105 communicate over a network 104 with an anomaly detection and resolution platform 110. The variable M and other similar index variables herein such as K, L and S are assumed to be arbitrary positive integers greater than or equal to one.

The user devices 102, host devices 103 and administrator devices 105 can comprise, for example, Internet of Things (IoT) devices, desktop, laptop or tablet computers, mobile telephones, or other types of processing devices capable of communicating with the anomaly detection and resolution platform 110 over the network 104. Such devices are examples of what are more generally referred to herein as "processing devices." Some of these processing devices are also generally referred to herein as "computers." The user devices 102, host devices 103 and administrator devices 105 may also or alternately comprise virtualized computing resources, such as virtual machines (VMs), containers, etc. The user devices 102, host devices 103 and/or administrator devices 105 in some embodiments comprise respective computers associated with a particular company, organization or other enterprise.

The terms "user" or "administrator" herein are intended to be broadly construed so as to encompass numerous arrangements of human, hardware, software or firmware entities, as well as combinations of such entities. Anomaly detection and resolution services may be provided for users utilizing one or more machine learning models, although it is to be appreciated that other types of infrastructure arrangements could be used. At least a portion of the available services and functionalities provided by the anomaly detection and resolution platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the anomaly detection and resolution platform 110, as well as to support communication between the anomaly detection and resolution platform 110 and connected devices (e.g., user devices 102, host devices 103 and administrator devices 105) and/or other related systems and devices not explicitly shown.

In some embodiments, the administrator devices 105 are assumed to be associated with repair technicians, system administrators, information technology (IT) managers, software developers, release management personnel or other authorized personnel configured to access and utilize the anomaly detection and resolution platform 110.

As explained in more detail herein, the host devices 103 comprise respective microservice instance(s) 106-1, 106-2, . . . 106-S (collectively "microservice instances 106"). A host device 103 may comprise one or more microservice instances 106 configured to execute designated services of an application. For example, a plurality of microservice instances 106 respectively corresponding to different microservices may collectively correspond to the services of a single application, with each microservice instance corresponding to an independently deployable service of the application. In illustrative embodiments, each function of the application is executed by an autonomous, independently-running microservice. As explained in more detail herein, a microservice may run in a container (e.g., Docker, Linux container (LXC) or other type of container) on a host device (e.g., host device 103). Different instances of the same microservice may run in different containers on the same host device or on different host devices 103. The host devices 103 may be, for example, cloud servers. Respective microservices may correspond to respective application functions such as, but not necessarily limited to, searching, messaging, payments, support, accounting, payroll, etc. The microservices are loosely integrated into an application using API gateways. Container orchestration tools such as, for example, Kubernetes®, can be utilized to manage the allocation of system resources for each microservice.

System behavior (e.g., transactional system behavior) is not always constant, and instead varies depending, for example, on the day of the week and time of year. A variety of factors can impact the performance and latency of microservices and their underlying implementing systems. For example, microservice performance can be impacted by the volume of transactions, numbers of users, amounts of database load, other prescheduled jobs running at the same time, etc. These factors may vary over the course of, for example, a day, week or month. Other factors that can affect microservice performance include, but are not necessarily limited to, increased seasonal load (e.g., Black Friday and other holiday sales), extract, transform and load (ETL) processing, batch jobs running at certain times, and an underperforming database. Resource issues such as, for example, high central processing unit (CPU) utilization, high memory utilization, high volumes of input/output (TO) operations and thread locking can directly impact a container hosting a microservice, which may increase the response time of the microservice or cause the microservice to time out. Resource issues may also cause the microservice to return errors. Network issues in the containers and host systems providing a run-time infrastructure can also impact microservices. As a result, many enterprises often grapple with slow performance of microservices, microservice call time-outs, unresponsive user interfaces, and reduced customer satisfaction.

Conventional approaches, including container orchestration tools, are reactive in nature when attempting to address microservice performance issues, and do not attempt to handle microservice issues until after they result in outages. For example, if the infrastructure of a container hosting a microservice is being over-utilized, remedial measures are not taken until after a container or hosting infrastructure has caused an outage. Advantageously, illustrative embodiments are proactive in nature, providing techniques to use machine learning to predict anomalies in microservice behavior and to adequately respond when such anomalies are predicted. Once anomalous behavior is identified in connection with a microservice instance (e.g., one of the microservice instances 106), the embodiments proactively switch operations to another microservice instance (e.g., another one of the microservice instances 106) prior to the occurrence of any issues. The embodiments provide a predictive and proactive framework for microservice issues. The framework is configured to predict microservice performance issues based on advanced detection of anomalies in microservice behavior. By leveraging a large amount of historical data for each of a plurality of microservices and microservice host components in normal situations and utilizing an unsupervised machine learning model, anomalous or outlier microservice behavior is predicted. Using the historical dataset, the machine learning model learns responses and latency for each microservice instance 106 and learns the resource state of microservice host components in normal situations. The machine learning model identifies anomalous behavior when the microservice metrics and/or host component resource utilization deviate from what has been learned as being normal. The framework is also configured to redirect microservice requests to alternate (e.g., secondary) microservice instances upon determining that the state of a primary microservice instance is anomalous.

The anomaly detection and resolution platform 110 in the present embodiment is assumed to be accessible to the user devices 102, host devices 103 and/or administrator devices 105 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the anomaly detection and resolution platform 110 includes a data collection engine 120, an anomaly prediction engine 130 and a state designation and routing engine 140. The data collection engine 120 includes a monitoring, collection and logging layer 121 and a historical microservices and host metrics repository 122. The anomaly prediction engine 130 includes a machine learning layer 131 comprising anomaly prediction and training layers 132 and 133. The state designation and routing engine 140 includes a state designation layer 141, an anomaly counter 142 and a routing layer 143.

The monitoring, collection and logging layer 121 of the data collection engine 120 collects parameters corresponding to processing by the microservice instances 106 of microservice operations (also referred to herein as "microservice transactions"). The parameters may be collected from the host devices 103 and/or from applications used for monitoring microservice and host component metrics, such as, for example, Kubernetes AmazonEKS® (Elastic Kubernetes Service) and AmazonECS® (Elastic Container Service), PKS® (Pivotal Container Service) and other container orchestration or monitoring tools. The parameters comprise, for example, microservice identifiers (e.g., microservice names), microservice operation request times and/or dates, microservice operation response time, microservice operation input/output (TO) parameters (e.g., throughput, IO operations per second (IOPS), latency), user information and/or error information. Other parameters can include, for example, identifiers (e.g., container IDs), CPU utilization, memory utilization and storage utilization of host components (e.g., host devices, containers, etc.) hosting a microservice. As used herein, "microservice operations" are to be broadly construed and refer to, for example, microservice transactions initiated by, for example, an invocation, request or call to a microservice. The microservice operations include, but are not necessarily limited to, read operations, write operations and/or subroutines used to, for example, perform application functions. The monitoring, collection and logging layer 121 collects current or real-time microservice operation data and host component resource utilization data corresponding to microservice operations which are in progress or have been recently completed (e.g., within microseconds or milliseconds). As explained in more detail herein, the collected data, including the corresponding parameters, is inputted to the anomaly prediction engine 130 to assess whether the transactions are anomalous and whether there is an issue with one of the microservice instances 106.

The monitoring, collection and logging layer 121 also collects historical parameters corresponding to processing by the microservice instances 106 of past microservice operations similar to the collected current or real-time microservice operation data and host component resource utilization data. The historical parameters may be collected from the host devices 103 and/or from applications used for monitoring microservice and host component metrics, such as, for example, the container orchestration or monitoring tools mentioned herein above, which log microservice, host component and application activity. The historical parameters relating to normal microservice operations (e.g., when a microservice is operating without any issues or problems) are stored in the historical microservices and host metrics repository 122 and input to the anomaly prediction engine 130 to be used as training data by the training layer 133. The historical parameters relating to normal microservice operations are used to train the machine learning models used by the anomaly prediction layer 132 to learn which parameters correspond to normal operation of the respective microservice instances 106.

The anomaly prediction engine 130, more particularly, the anomaly prediction layer 132 of the machine learning layer 131, analyzes the parameters collected by the monitoring, collection and logging layer 121 using one or more machine learning algorithms, and predicts, based at least in part on the analyzing, whether microservice operations being executed by the microservice instances 106 are anomalous. For example, under normal operating conditions, each microservice instance 106 may have a specific response time that can vary between the microservice instances 106. During issues, outages and/or overloaded situations, the response times may vary, and may be considered as outliers or anomalies by the anomaly prediction layer 132. The anomaly prediction layer 132 analyzes the parameters collected by the monitoring, collection and logging layer 121 to identify abnormal patterns in the data to determine outliers. For example, based on historical parameter data, the training layer 133 trains the machine learning model to identify what constitutes normal operational parameters in the microservice instances 106. Deviations from normal operations found in, for example, real-time microservice invocation metrics, are considered anomalies by the anomaly prediction layer 132.

FIG. 5 depicts example training data in an illustrative embodiment. As can be seen in the table 500, the training data identifies a date of the microservice operation, the microservice name, a latency of the microservice operation, a container ID number, CPU utilization percentage, memory (e.g., RAM) utilization percentage and storage utilization percentage. The data shown in the table 500 is a non-limiting example of the attributes of training data, and the embodiments are not necessarily limited to the depicted attributes.

By identifying the anomalous microservice operation, the anomaly prediction layer 132 predicts an upcoming outage to the native container and/or the host server of the container acting as the runtime infrastructure of the microservice. Historical metrics of the microservices and their hosting infrastructure (e.g., container, host server), as described above, are harvested from the monitoring, collection and logging layer 121, which may be a cloud-based service. As noted herein, the historical metrics data is used to train the machine learning model in the anomaly prediction layer 132 to identify situations that are not considered normal.

The anomaly prediction layer 132 leverages an unsupervised learning approach and machine learning models to detect anomalies in the microservice instances 106 to accurately predict outages. By predicting a potential outage before it occurs, the anomaly prediction layer 132 provides a basis for a decision by the state designation and routing engine 140 to designate a state of microservice instance 106 as anomalous and route microservice requests to a different one of the microservice instances 106, thus proactively eliminating the effects of an outage prior to a failure and enabling correction of problems with microservices without any service interruptions. As explained further herein, some of the microservice instances 106 connected to the anomaly detection and resolution platform 110 operate as primary microservice instances, while other ones of the microservice instances 106 operate as secondary microservice instances. According to an embodiment, the primary microservice instances are first options to respond to microservice calls or requests, and the parameters collected from the primary microservice instances in connection with responding to the microservice calls or requests are analyzed by the anomaly prediction engine 130 to determine if there are any anomalies. If a primary microservice instance is designated as anomalous, microservice requests are routed to a secondary microservice instance.

Based, at least in part, on inputs from the anomaly prediction engine 130 comprising determinations of whether microservice operations are anomalous, a state designation layer 141 of the state designation and routing engine 140 determines whether a microservice instance 106 (e.g., a primary microservice instance) should be designated as being in an anomalous state. According to an embodiment, the state designation and routing engine 140 maintains one or more flags to store states of respective ones of a plurality of microservice instances 106. In a normal condition for a given microservice instance, the flag is set to NORMAL and the routing layer 143 directs all calls to the microservice to the given microservice instance in a primary container. The flag may be set to ANOMALOUS when the machine learning model of the anomaly prediction engine 130 determines that microservice operations corresponding to the given microservice instance are anomalous. When the flag is set to ANOMALOUS, the routing layer 143 direct all calls to the microservice to a secondary microservice instance in a different container. The state designation layer 141 manages the flags to maintain the state of microservice instances 106 and their corresponding containers on which the microservice instances 106 are deployed so that microservice requests can be routed by the routing layer 143 to the appropriate endpoints. As explained in more detail herein, in one or more embodiments, a microservice instance is not designated as anomalous until a threshold consecutive number of microservice operations associated with the given microservice instance (recorded by the anomaly counter 142) have been predicted as anomalous.

Figure 2:
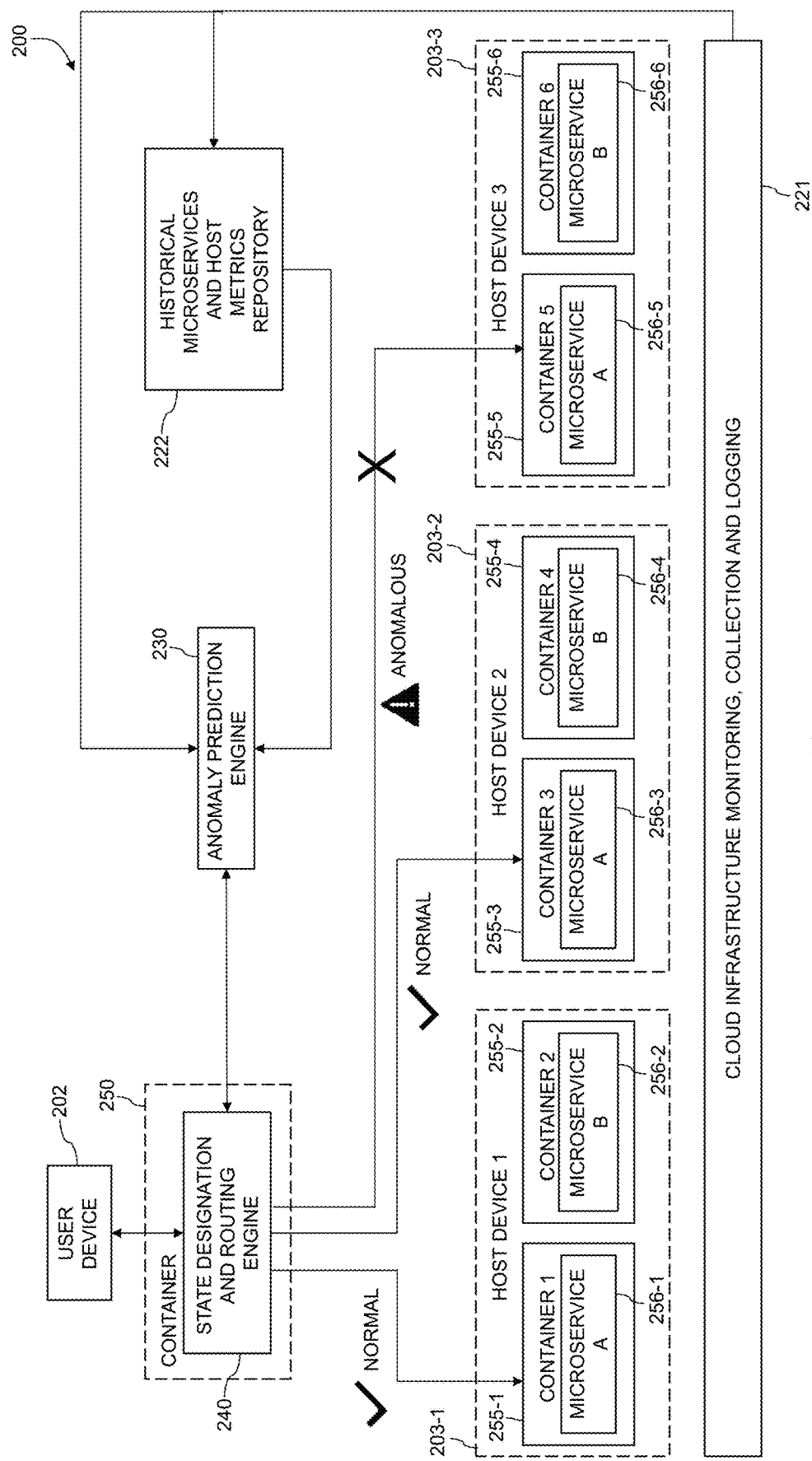
FIG. 2 depicts an operational flow for microservice anomaly prediction and microservice routing in an illustrative embodiment.

Referring to the operational flow 200 in FIG. 2, the cloud infrastructure monitoring, collection and logging layer 221, which is the same as or similar to the monitoring, collection and logging layer 121, monitors, collects and logs past and current microservice operation and host component parameters as described hereinabove. The past microservice operation and host component parameter data is sent to the historical microservices and host metrics repository 222 (which is the same as or similar to the historical microservices and host metrics repository 122) and is provided to the anomaly prediction engine 230 as training data. The anomaly prediction engine 230 is the same as or similar to the anomaly prediction engine 130.

The cloud infrastructure monitoring, collection and logging layer 221 monitors, collects and logs past and current microservice operation and host component parameters from the host device 1 203-1, host device 2 203-2 and host device 3 203-3 (collectively "host devices 203"), which can be the same as or similar to the host devices 103. Host device 1 203-1 comprises container 1 255-1 and container 2 255-2 respectively hosting instances of microservice A 256-1 and microservice B 256-2. Host device 2 203-2 comprises container 3 255-3 and container 4 255-4 respectively hosting additional instances of microservice A 256-3 and microservice B 256-4. Host device 3 203-2 comprises container 5 255-5 and container 6 255-6 respectively hosting further instances of microservice A 256-5 and microservice B 256-6. Although three host devices 203 each comprising two containers 255 and two microservice instances 256 are shown, the embodiments are not necessarily limited thereto. For example, there may be more or less than three host devices 203, and the number of containers 255 and microservice instances 256 in each host device 203 can vary. Microservices A and B are different microservices (e.g., perform different functions). Different instances of microservice A in different containers correspond to the same microservice (e.g., perform the same function). Different instances of microservice B in different containers correspond to the same microservice (e.g., perform the same function).

The operational flow 200 further depicts a user device 202, which may be the same as or similar to one of the user devices 102, and a state designation and routing engine 240, which may be the same as or similar to the state designation and routing engine 140. The state designation and routing engine 240 is hosted in container 250 (e.g., Docker, LXC or other type of container) and acts as a router for invocation of microservices to the appropriate containers 255. In illustrative embodiments, the state designation and routing engine 240 comprises an enhanced circuit breaker design that maintains flags as described herein above to store the state of the microservice instances 256 and their corresponding containers 255. For example, based on an analysis of the microservice operation and host component parameters received from the cloud infrastructure monitoring, collection and logging layer 221, the trained machine learning model of the anomaly prediction engine 230 predicts whether any microservice operations executed by the microservice instances 256 are anomalous. Based on the prediction, the state designation and routing engine 240 designates one or more microservice instances 256 and their corresponding containers 255 as being in a normal or an anomalous state. For example, as can be seen in FIG. 2, with respect to microservice A, the state designation and routing engine 240 designates instances of microservice A 256-1 and 256-3 in containers 1 and 3 255-1 and 255-3 as being in a normal state, and the instance of microservice A 256-5 in container 5 255-5 as being in an anomalous state. As a result, requests for microservice A received from, for example, user device 202, will be routed by the state designation and routing engine 240 to either the instance of microservice A 256-1 in container 1 255-1 or the instance of microservice A 256-3 in container 3 255-3. Such routing will continue until the state designation and routing engine 240 changes the flags for one or more of the instances of microservice A 256-1, 256-3 or 256-5 and their corresponding containers 255-1, 255-3 or 255-5.

Figure 3:
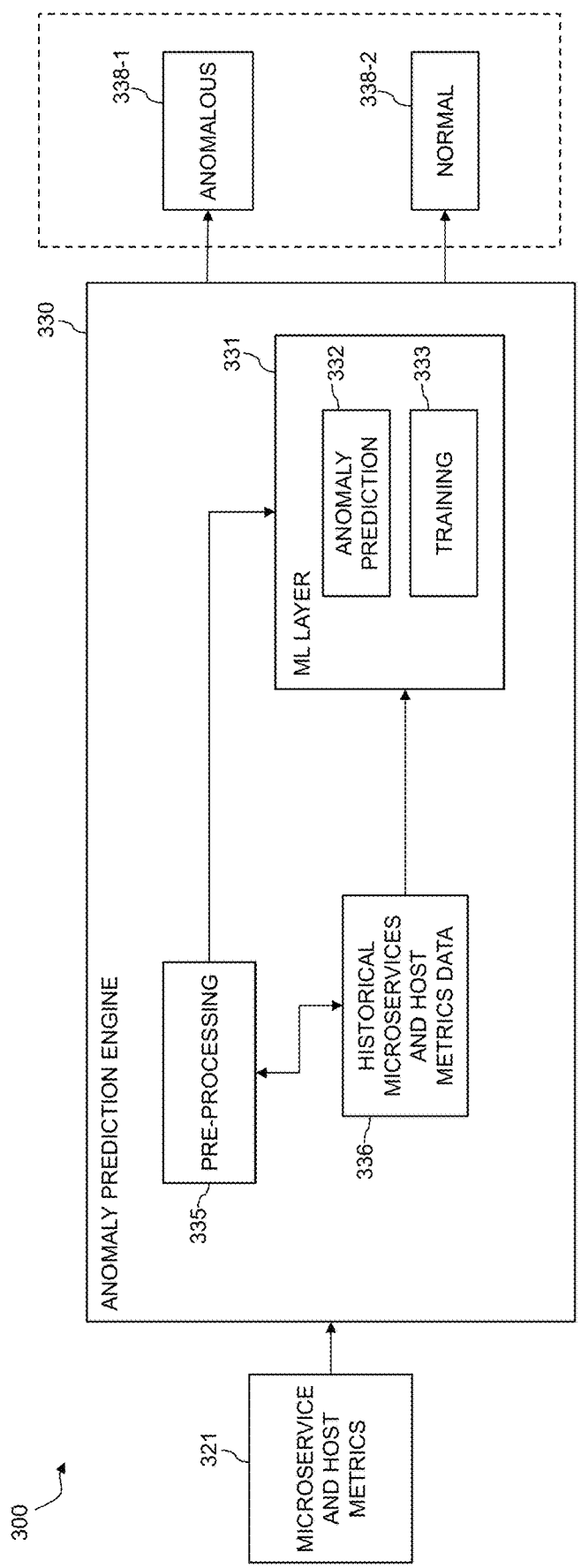
FIG. 3 depicts an operational flow for microservice anomaly prediction in an illustrative embodiment.

Referring to the operational flow 300 in FIG. 3, a more detailed explanation of an embodiment of an anomaly prediction engine 330 is described. The anomaly prediction engine 330 may be the same as or similar to the anomaly prediction engine 130 or 230. The microservice and host metrics 321 collected by, for example, a monitoring, collection and logging layer (e.g., monitoring, collection and logging layer 121 or 221) are input to the anomaly prediction engine 330. The anomaly prediction engine 330 illustrates a pre-processing component 335, which processes the incoming microservice and host metrics 321 and the historical microservices and host metrics data 336 for analysis by the machine learning (ML) layer 331. For example, the pre-processing component 335 removes any unwanted characters, punctuation, and stop words. As can be seen in FIG. 3, the anomaly prediction engine 330 analyzes the incoming microservice and host metrics 321 using the ML layer 331 comprising anomaly prediction and training layers 332 and 333. The ML layer 331 is the same as or similar to machine learning layer 131. Based on the analysis, the anomaly prediction layer 332 determines, based on the microservice and host metrics 321, whether an operation corresponding to a given microservice instance is anomalous 338-1 or normal 338-2.

In connection with the operation of the anomaly prediction engine 330 (or 130/230), FIG. 6 depicts example pseudocode 600 for importation of libraries used to implement the anomaly prediction engine 330. For example, Python, ScikitLearn, Pandas and Numpy libraries can be used. FIG. 7A depicts example pseudocode 701 for loading historical microservices and hosting container metrics into a Pandas data frame for building training data. Similar to FIG. 5, FIG. 7B depicts a table 702 of example training data in an illustrative embodiment. As can be seen in the table 702, the training data identifies a date of the microservice operation, the microservice name, a latency of the microservice operation, a container ID number, CPU utilization percentage, memory (e.g., RAM) utilization percentage and storage utilization percentage. The data shown in the table 702 is a non-limiting example of the attributes of training data, and the embodiments are not necessarily limited to the depicted attributes.

FIG. 8 depicts example pseudocode 800 for encoding training data in an illustrative embodiment. For example, since machine learning works with numbers, categorical and textual attributes like the microservice name must be encoded before being used as training data. In one or more embodiments, this can be achieved by leveraging a LabelEncoder function of ScikitLearn library as shown in the pseudocode 800.

The ML layer 331 leverages unsupervised learning methodology for outlier detection of the behavior of the microservice instances 106 (or 256). In an embodiment, the machine learning layer 231 (or 131) implements multivariate anomaly detection using an isolation forest algorithm, which does not require labeled training data. The isolation forest algorithm identifies anomalies among the normal observations, by setting up a threshold value in a contamination parameter that can apply for real-time predictions. The isolation forest algorithm has the capacity to scale up to handle extremely large data sizes (e.g., terabytes) and high-dimensional problems with a large number of attributes, some of which may be irrelevant and potential noise. The isolation forest algorithm has relatively low linear time complexity and prevents masking and swamping effects in anomaly detection. A masking effect is where a model predicts normal behavior when the behavior is anomalous. A swamping effect is where a model predicts anomalous behavior when the behavior is normal.

Figure 4B:
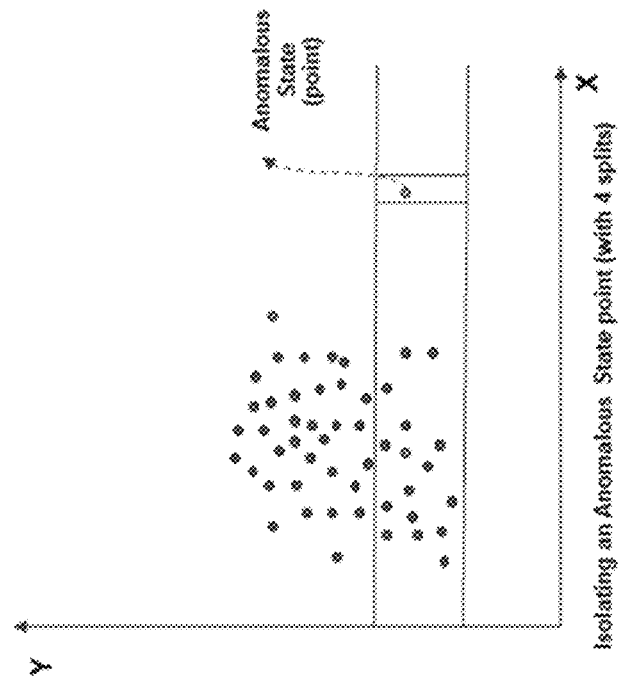
FIG. 4B depicts a plot illustrating isolation of an anomalous state point in an illustrative embodiment.
Figure 4A:
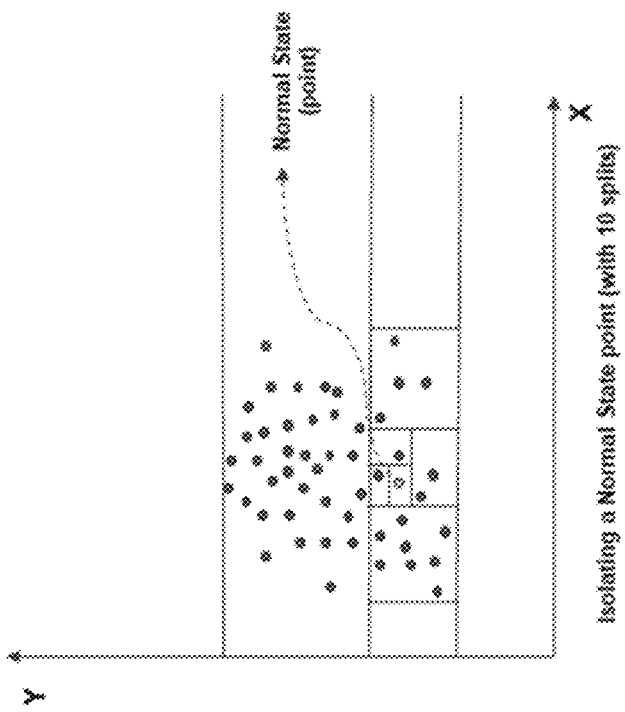
FIG. 4A depicts a plot illustrating isolation of a normal state point in an illustrative embodiment.

In illustrative embodiments, the machine learning model used by the ML layer 331 (or 131) isolates an anomaly by creating decision trees over random attributes. This random partitioning produces significantly shorter paths since fewer instances of anomalies result in smaller partitions, and distinguishable attribute values are more likely to be separated in early partitioning. As a result, when a group (e.g., forest) of random trees collectively produces shorter path lengths for some particular points, then they are highly likely to be anomalies. A larger number of splits are required to isolate a normal point, while an anomaly can be isolated by a shorter number of splits. For example, referring to the plots 401 and 402 in FIGS. 4A and 4B, a normal state point is isolated with 10 splits and an anomalous state point is isolated with four splits. The splits are shown as horizontal and vertical lines in the plot of points. The number of splits determine the level at which the isolation occurred and is used by the anomaly prediction layer 332 (or 132) to generate an anomaly score. The process is repeated multiple number of times and the isolation level of each point is noted. Once an iteration is completed, the anomaly score of each point/instance suggests the likeliness of an anomaly. The score is a function of the average level at which the point is isolated. The top points/instances having an anomaly score exceeding a threshold are labeled as anomalies by the anomaly prediction layer 332 (or 132). Alternatively, the ML layer 331 (or 131) uses supervised learning models such as, for example, support vector machines (SVMs) or neural networks.

In illustrative embodiments, the monitoring, collection and logging layer 121/221 collects microservice operation and host component parameters (e.g., microservice and host metrics 321), and inputs the collected parameters to the anomaly prediction engine 130/230/330 to perform anomaly prediction. The machine learning model (e.g., isolation forest model) is trained using historical parameter data (e.g., historical microservices and host metrics data 336). If the anomaly prediction layer 132 (or 332) identifies parameter values deviating from typical values for a given microservice and/or having an anomaly score exceeding a threshold, the anomaly prediction layer 132 (or 332) identifies a transaction associated with a given microservice instance as anomalous (e.g., anomalous 338-1). If the anomaly prediction layer 132 (or 332) identifies parameter values consistent with typical values for a given microservice instance and/or having an anomaly score less than a threshold, the anomaly prediction layer 132 (or 332) identifies a transaction associated with a given microservice instance as normal (e.g., normal 338-2).

Referring back to FIG. 2, the predicted transaction state is transmitted to a state designation and routing engine 240 (or 140). The state designation and routing engine 240 (or 140) designates a microservice instance as being in an anomalous or normal state, and routes subsequent microservice requests to a microservice instance 106 (or 256) in a normal state based on the designation.

Figure 9:
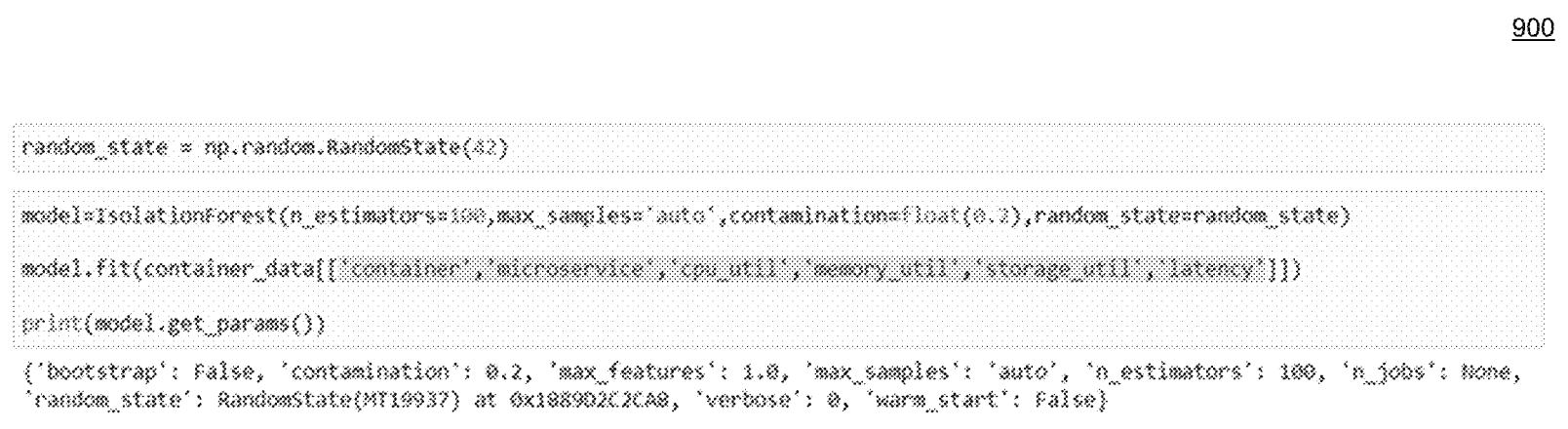

FIG. 9 depicts example pseudocode 900 for training an isolation forest model in an illustrative embodiment. For example, the isolation forest model is instantiated from ScikitLearn.ensemble package with some designated hyperparameters, such as, for example, a contamination parameter and a parameter for the number of estimators. Then the model is trained by passing the historical training data stored in the data frame.

FIG. 10A depicts example pseudocode 1001 for computing anomaly scores using a model predict function in an illustrative embodiment, FIG. 10B depicts a table 1002 including example training data with anomaly scores in an illustrative embodiment. In one or more embodiments, the anomaly scores can be obtained from the model by using a model.predict( ) function in connection with the values of the microservice operation and host infrastructure metrics. An anomaly score of −1 indicates a predicted anomaly and an anomaly score of 1 indicates a normal state prediction.

FIG. 11 depicts example pseudocode 1100 for computing an accuracy score of the machine learning model and for generating predictions for two microservice instances in different containers in an illustrative embodiment. For example, in connection with generating the predictions for the two microservice instances, the predictions are generated based on the latency of the microservice operation and the metrics of the corresponding container (e.g., CPU, memory and storage utilization). If the anomaly score is 1, then the output is a normal container state, and if the anomaly score is −1, the output is an anomalous container state. The first microservice instance is predicted to be anomalous and the second microservice instance is predicted to be normal.

When a microservice is invoked, the metrics for the microservice operation and host infrastructure metrics corresponding to a given microservice instance are input to the trained model for prediction. If the model detects that the metrics vary significantly from the typical metrics for that specific microservice instance based on the historical data, that microservice operation will be flagged as an anomaly or outlier. As noted herein, according to one or more embodiments, a single instance of an anomalous microservice operation for a specific microservice instance does not give rise to an anomalous microservice instance designation since transient anomalous transactions may occur. Instead, once a configurable threshold number of consecutive anomalous microservice operations for the same microservice instance is reached, the microservice instance will be designated as anomalous (by, for example, the state designation layer 141), so that all subsequent requests for that microservice will be routed to one or more secondary/back-up microservice instances host by, for example, a different container. The state designation and routing engine 140 (or 240) (e.g., routing layer 143) performs the tasks required to route microservice requests away from a microservice instance that is predicted to fail (e.g., anomalous microservice instance) to a fail-over microservice instance (e.g., normal microservice instance) so that transactional integrity, continued microservice performance and quality of service are maintained. According to an embodiment, once an anomalous state is designated, the state designation and routing engine 140 (or 240) sends an alert or notification to one or more administrator devices (e.g., administrator devices 105) so that users (e.g., operational team members) may initiate an investigation of the potential issue with the microservice instance in the anomalous state.

Figure 12:
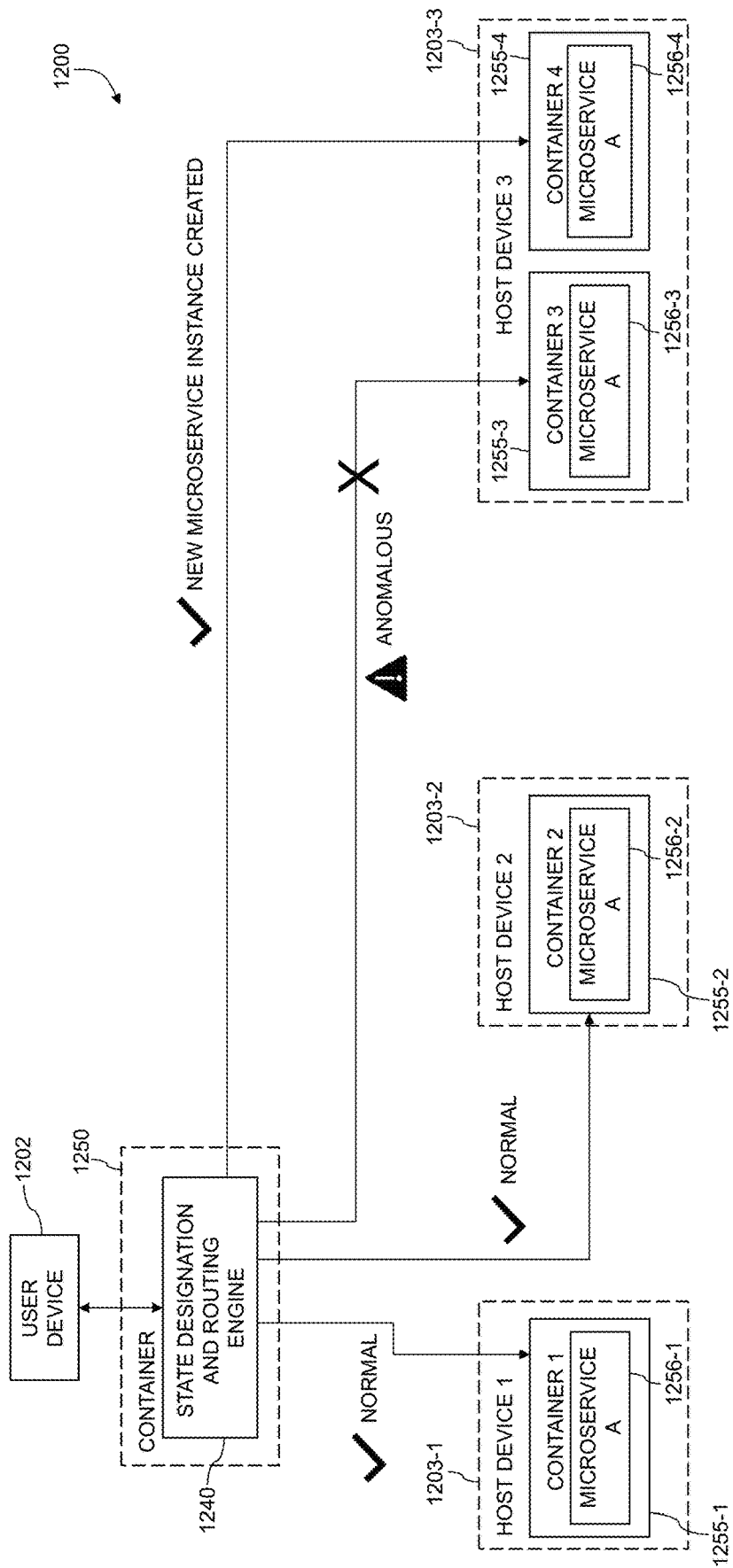
FIG. 12 depicts an operational flow for microservice routing in a containerized active/active architecture in an illustrative embodiment.

Referring to the operational flow 1200 for microservice routing in a containerized active/active architecture in FIG. 12, in the case of a containerized deployment of microservices or in environments where the microservices are deployed in, for example, VMs with active/active modes, the same microservice is deployed and hosted in multiple environments. For example, instances of the same microservice A 1256-1, 1256-2 and 1256-3 are deployed in container 1 1255-1, container 2 1255-2 and container 3 1255-3 of host device 1 1203-1, host device 2 1203-2 and host device 3 1203-3, respectively. In the operational flow 1200, the state designation and routing engine 1240, which is in container 1250 (e.g., Docker, LXC or other type of container), keeps track of a plurality of endpoints (e.g., multiple containers 1, 2 and 3 1255-1, 1255-2 and 1255-3) for a given microservice (microservice A) and routes microservice invocations from a user device 1202 to these endpoints in a round robin manner for load balancing. If a microservice instance in a given container is determined to be in an anomalous state (e.g., the instance of microservice A 1256-3 in container 3 1255-3), the state designation and routing engine 1240 removes that endpoint from the pool of possible endpoints for routing and routes the microservice invocations between the remaining available endpoints (e.g., normal instances of microservice A 1256-1 and 1256-2 in containers 1 and 2 1255-1 and 1255-2). Additionally, in a containerized environment with autoscaling enabled, the state designation and routing engine 1240 triggers creation of one or more other microservice instances by invoking an appropriate function from one or more container orchestration tools. As shown in FIG. 12, a new instance of microservice A 1256-4 is created in container 4 1255-4 in host device 3 1203-3, and can be added to the pool of possible endpoints for routing microservice invocations. Further, in illustrative embodiments, the state designation and routing engine 1240 sends an alert message to one or more operational team members about the anomalous microservice instances. The operational team members may take remedial measures to prevent outages to a corresponding host system. As a result, automated resolution processes are executed.

Figure 13:
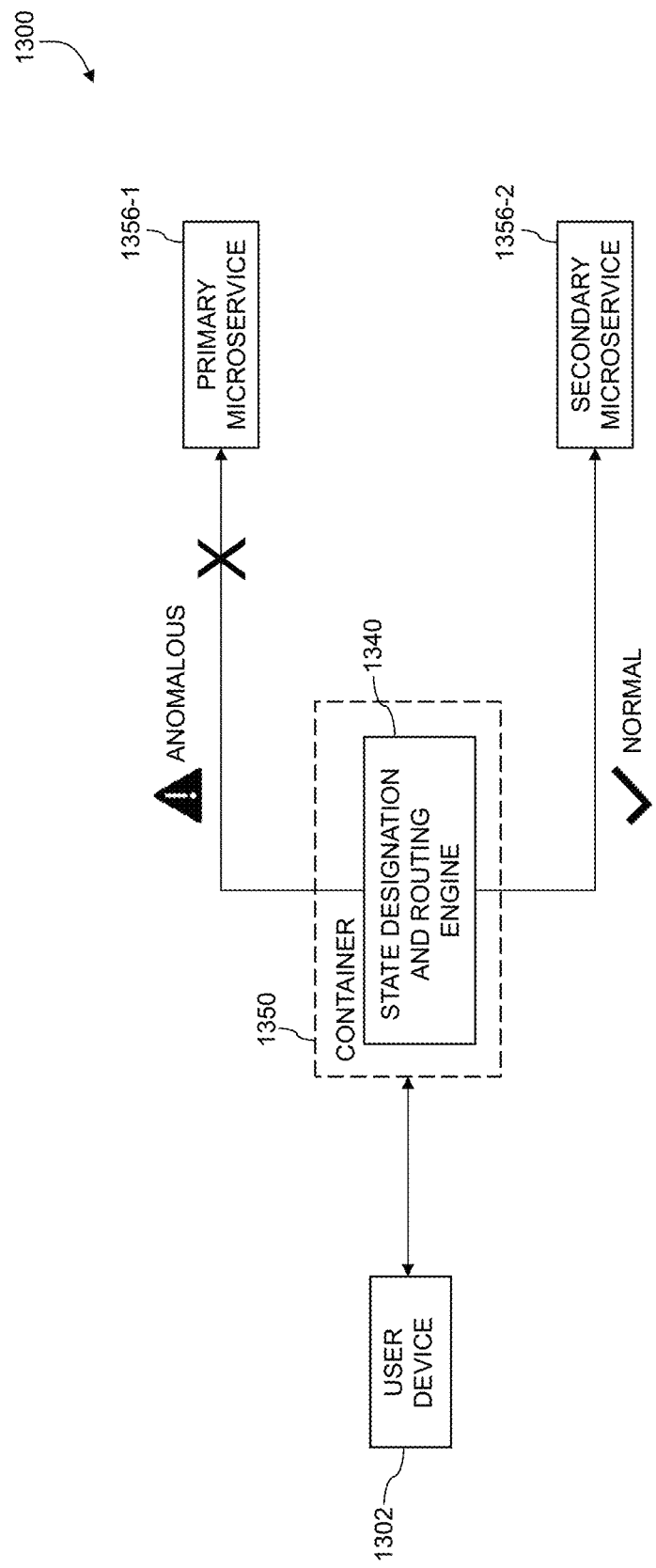
FIG. 13 depicts an operational flow for microservice routing in an active/passive architecture in an illustrative embodiment.

Referring to the operational flow 1300 for microservice routing in an active/passive architecture in FIG. 13, in environments where the microservices are deployed in, for example, virtual machines (VMs) with active/passive modes, the state designation and routing engine 1340, which is in container 1350 (e.g., Docker, LXC or other type of container), determines whether to direct a microservice request from a user device 1302 to a primary endpoint (e.g., primary microservice instance 1356-1) or a secondary endpoint (e.g., secondary microservice instance 1356-2) based on one or more inputs from an anomaly prediction engine (e.g., anomaly prediction engine 130, 230 or 330) predicting whether microservice operations corresponding to the microservice instances (e.g., microservice instances 1356-1 and 1356-2) are normal or anomalous. The state designation and routing engine 1340 utilizes a circuit breaker pattern, where a circuit of the state designation and routing engine 1340 is closed during normal situations and opens when a microservice instance is determined to be in an anomalous state. In normal (e.g., non-anomalous) situations, the state designation and routing engine 1340 determines the primary microservice instance 1356-1 to be in a NORMAL state, the circuit is closed, and microservice requests from a user device 1302 will be forwarded to the primary endpoint (e.g., primary microservice instance 1356-1). As depicted in FIG. 13, when the state designation and routing engine 1340 determines the primary microservice instance 1356-1 to be in an ANOMALOUS state, the circuit is open, and microservice requests from a user device 1302 will be forwarded to the secondary endpoint (e.g., secondary microservice instance 1356-2).

The anomaly counter 142 of the state designation and routing engine 140 tracks a number of anomalous microservice operations (transactions) corresponding to a particular microservice instance. For example, when microservice operation is predicted as anomalous by the anomaly prediction engine 130, the anomaly counter 142 begins a new count of anomalous transactions if the transaction is a first transaction predicted to be anomalous for the particular microservice instance. The anomaly counter 142 also begins a new count of anomalous transactions if the transaction is a first transaction predicted to be anomalous for a particular microservice instance after a normal transaction for that microservice instance. Consecutive anomalous transactions for a given microservice instance increment the anomaly count for the given microservice instance, while a normal transaction for the given microservice instance resets the anomaly count to 0 for the given microservice instance.

Figure 14:
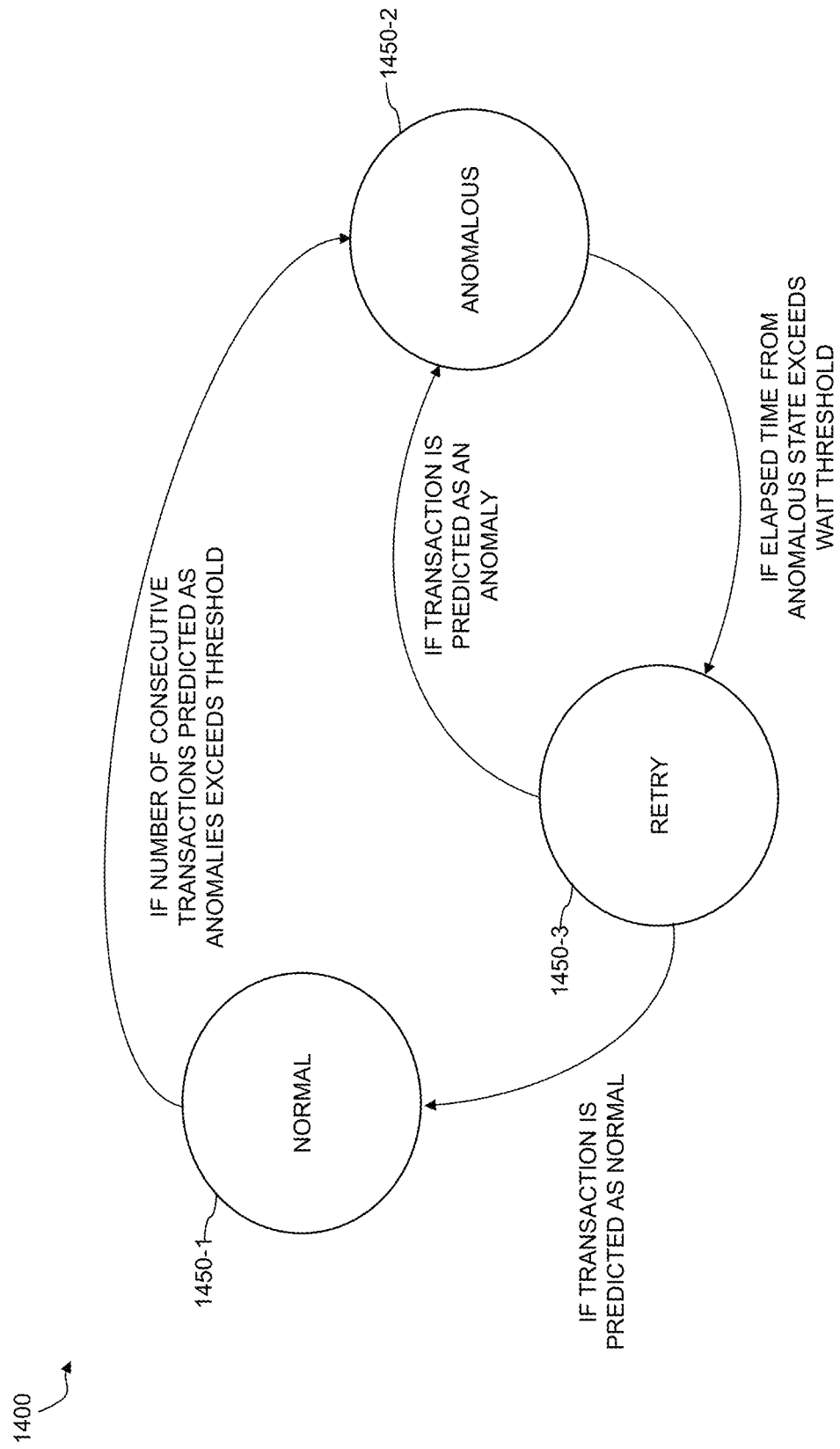
FIG. 14 depicts a process for state designation in an illustrative embodiment.

Referring to the state designation process 1400 in FIG. 14, upon reaching a predetermined threshold number of anomalous transactions for a given microservice instance (in a non-limiting example, a default value can be 5 consecutive anomalous transactions), the state designation layer 141 of the state designation and routing engine 140 sets a state of the given microservice instance as ANOMALOUS 1450-2 and, for example, sends microservice requests to remaining available microservice instances in a pool of microservice instances as in FIG. 12, or opens the circuit in FIG. 13.

As seen in FIG. 14, the state was previously NORMAL 1450-1. As a result of being designated as anomalous, the routing layer 143 forwards microservice requests for that microservice to a secondary microservice instance. According to an embodiment, if a microservice instance is in a designated ANOMALOUS state 1450-2 for a predetermined period of time, the state designation layer 141 will commence a procedure to verify whether the microservice instance is in proper working order, or if the microservice instance issues remain. If the microservice instance is found to be in proper working order following verification, the state designation layer 141 will return the microservice instance to a normal state designation, where the routing layer 143 will send subsequent microservice requests to the newly designated normal microservice instance. For example, referring to FIG. 14, after a predetermined period of time of being in the designated ANOMALOUS state 1450-2, the state designation layer 141 will change the state of the microservice instance to RETRY 1450-3. When in the RETRY state 1450-3, an incoming microservice request will be sent to the microservice instance being tested and not another microservice instance, and the transaction parameters will be analyzed by the anomaly prediction engine 130 to determine whether the transaction is normal or anomalous. If, during the RETRY state 1450-3, the transaction for the microservice instance being tested is predicted as anomalous by the anomaly prediction engine 130, the state designation layer 141 will change the state of the microservice instance back to ANOMALOUS 1450-2 and wait for the predetermined period of time to again elapse before again switching to the RETRY state 1450-3 and re-attempting to verify whether the microservice instance is in proper working order. When in the RETRY state 1450-3, if a transaction for a microservice instance being tested is predicted as normal by the anomaly prediction engine 130, the state designation layer 141 will change the state of the microservice instance being tested to NORMAL 1450-1 and the subsequent microservice requests will be forwarded to the newly designated normal microservice instance. The threshold number of consecutive anomalous transactions and the predetermined period of time to wait before verifying if a microservice instance is in working order may be configured by a user or default values can be used.

According to one or more embodiments, the historical microservices and host metrics repository 122 and other data repositories or databases referred to herein can be configured according to a relational database management system (RDBMS) (e.g., PostgreSQL). In some embodiments, the historical microservices and host metrics repository 122 and other data repositories or databases referred to herein are implemented using one or more storage systems or devices associated with the anomaly detection and resolution platform 110. In some embodiments, one or more of the storage systems utilized to implement the historical microservices and host metrics repository 122 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the anomaly detection and resolution platform 110, the data collection engine 120, anomaly prediction engine 130 and/or state designation and routing engine 140 in other embodiments can be implemented at least in part externally to the anomaly detection and resolution platform 110, for example, as stand-alone servers, sets of servers or other types of systems coupled to the network 104. For example, the data collection engine 120, anomaly prediction engine 130 and/or state designation and routing engine 140 may be provided as cloud services accessible by the anomaly detection and resolution platform 110.

The data collection engine 120, anomaly prediction engine 130 and/or state designation and routing engine 140 in the FIG. 1 embodiment are each assumed to be implemented using at least one processing device. Each such processing device generally comprises at least one processor and an associated memory, and implements one or more functional modules for controlling certain features of the data collection engine 120, anomaly prediction engine 130 and/or state designation and routing engine 140.

At least portions of the anomaly detection and resolution platform 110 and the elements thereof may be implemented at least in part in the form of software that is stored in memory and executed by a processor. The anomaly detection and resolution platform 110 and the elements thereof comprise further hardware and software required for running the anomaly detection and resolution platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, anomaly prediction engine 130, state designation and routing engine 140 and other elements of the anomaly detection and resolution platform 110 in the present embodiment are shown as part of the anomaly detection and resolution platform 110, at least a portion of the data collection engine 120, anomaly prediction engine 130, state designation and routing engine 140 and other elements of the anomaly detection and resolution platform 110 in other embodiments may be implemented on one or more other processing platforms that are accessible to the anomaly detection and resolution platform 110 over one or more networks. Such elements can each be implemented at least in part within another system element or at least in part utilizing one or more stand-alone elements coupled to the network 104.

It is assumed that the anomaly detection and resolution platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, anomaly prediction engine 130, state designation and routing engine 140 and other elements of the anomaly detection and resolution platform 110, and the elements thereof can each be implemented in the form of one or more LXCs running on one or more VMs. Other arrangements of one or more processing devices of a processing platform can be used to implement the data collection engine 120, anomaly prediction engine 130 and state designation and routing engine 140, as well as other elements of the anomaly detection and resolution platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the anomaly detection and resolution platform 110 to reside in different data centers. Numerous other distributed implementations of the anomaly detection and resolution platform 110 are possible.

Accordingly, one or each of the data collection engine 120, anomaly prediction engine 130, state designation and routing engine 140 and other elements of the anomaly detection and resolution platform 110 can each be implemented in a distributed manner so as to comprise a plurality of distributed elements implemented on respective ones of a plurality of compute nodes of the anomaly detection and resolution platform 110.

It is to be appreciated that these and other features of illustrative embodiments are presented by way of example only, and should not be construed as limiting in any way. Accordingly, different numbers, types and arrangements of system elements such as the data collection engine 120, anomaly prediction engine 130, state designation and routing engine 140 and other elements of the anomaly detection and resolution platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the anomaly detection and resolution platform can be offered to cloud infrastructure customers or other users as part of FaaS, CaaS and/or PaaS offerings.

Figure 15:
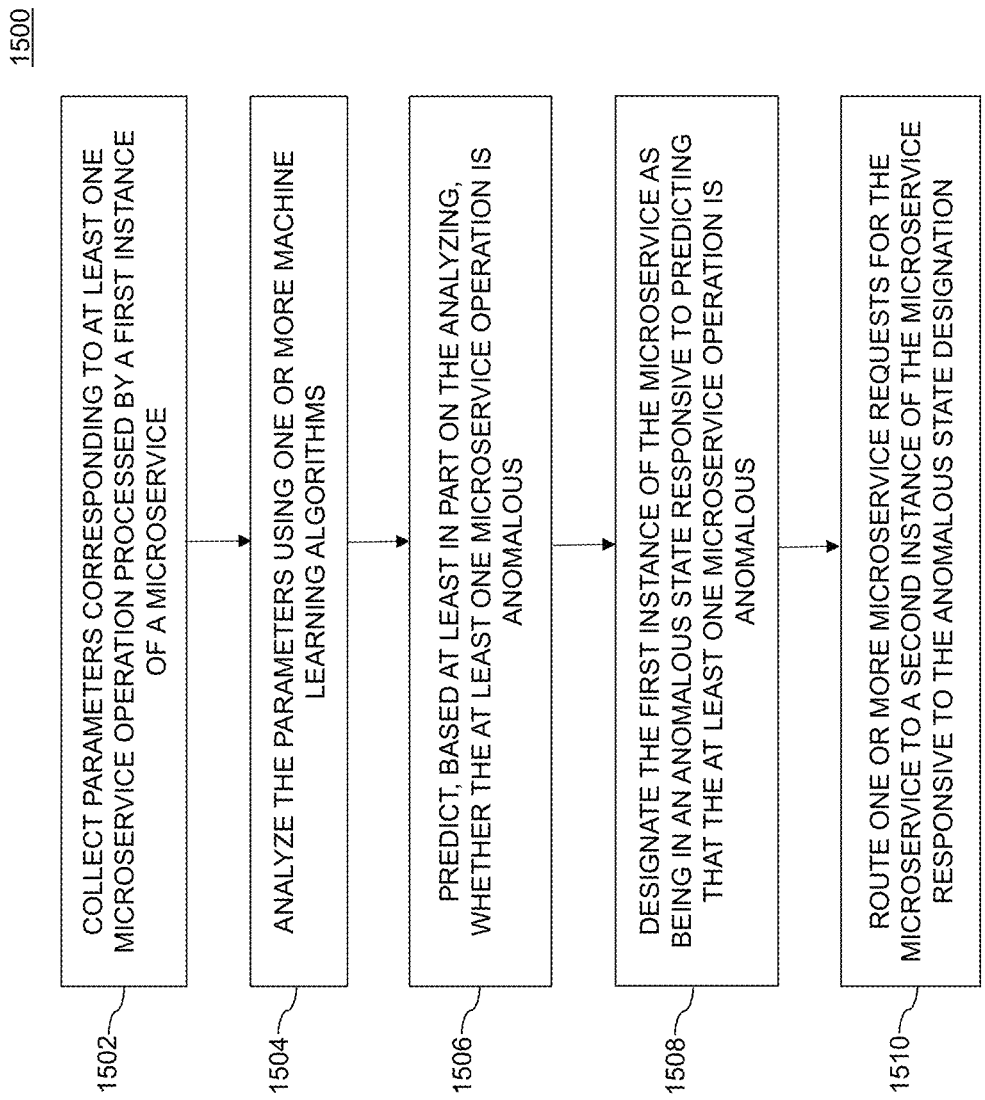
FIG. 15 depicts a process for microservice anomaly prediction and microservice routing according to an illustrative embodiment.

The operation of the information processing system 100 will now be described in further detail with reference to the flow diagram of FIG. 15. With reference to FIG. 15, a process 1500 for anomaly detection and resolution as shown includes steps 1502 through 1510, and is suitable for use in the system 100 but is more generally applicable to other types of information processing systems comprising an anomaly detection and resolution platform configured for proactive detection and resolution of microservice issues.

In step 1502, parameters corresponding to at least one microservice operation processed by a first instance of a microservice are collected. The parameters comprise, for example, a microservice identifier, a request time of the at least one microservice operation, a response time of the at least one microservice operation and/or latency of the at least one microservice operation. The parameters also comprise CPU utilization, memory utilization and/or storage utilization of at least one host component hosting the first instance of the microservice. The at least one host component comprises a container.

In step 1504, the parameters are analyzed using one or more machine learning algorithms. In illustrative embodiments, the one or more machine learning algorithms utilize an unsupervised learning technique to detect one or more outlier parameters of the parameters, and comprise an isolation forest algorithm. The one or more machine learning algorithms are trained with training data comprising historical parameter data.

In step 1506, based at least in part on the analyzing, a prediction is made whether the at least one microservice operation is anomalous. In step 1508, the first instance of the microservice is designated as being in an anomalous state responsive to predicting that the at least one microservice operation is anomalous. In step 1510, one or more microservice requests for the microservice are routed to a second instance of the microservice responsive to the anomalous state designation.

According to illustrative embodiments, the first instance of the microservice is hosted in a first container and the second instance of the microservice is hosted in a second container, wherein the first container is a component of a first host device and the second container is a component of a second host device. The method may further comprise creating the second instance of the microservice in the second container.

In one or more embodiments, the process further includes determining whether a threshold number of microservice operations of a plurality of microservice operations processed by the first instance of the microservice have been predicted as anomalous before designating the first instance of the microservice as being in an anomalous state. The threshold number of microservice operations may comprise a consecutive number of microservice operations processed by the first instance of the microservice.

In illustrative embodiments, the anomalous state designation of the first instance of the microservice is verified. The verifying comprises routing at least one microservice request to the first instance of the microservice instead of the second instance of the microservice, collecting additional parameters corresponding to processing by the first instance of the microservice of a microservice operation associated with the at least one microservice request, analyzing the additional parameters using the one or more machine learning algorithms, and predicting, based at least in part on the analyzing, whether the microservice operation associated with the at least one microservice request is anomalous.

The anomalous state designation of the first instance of the microservice is maintained responsive to predicting that the microservice operation associated with the at least one microservice request is anomalous. The anomalous state designation of the first instance of the microservice is changed to a normal state designation responsive to predicting that the microservice operation associated with the at least one microservice request is not anomalous. Subsequent microservice requests for the microservice are routed to the first instance of the microservice responsive to the normal state designation.

It is to be appreciated that the FIG. 15 process and other features and functionality described above can be adapted for use with other types of information systems configured to execute anomaly detection and resolution services in an anomaly detection and resolution platform or other type of platform.

The particular processing operations and other system functionality described in conjunction with the flow diagram of FIG. 15 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 15 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an anomaly detection and resolution platform as disclosed herein can provide a number of significant advantages relative to conventional arrangements. For example, the anomaly detection and resolution platform uses machine learning to proactively predict microservice outages to minimize impact on applications relying on microservice operations. The embodiments advantageously leverage an unsupervised learning approach and machine learning models to detect anomalies in microservice transactions and accurately predict microservice outages. By predicting an upcoming outage before it occurs, the embodiments facilitate routing of microservice requests to different microservice instances in different containers and eliminate the effects of outages by addressing them prior to their actual occurrence.

Unlike conventional approaches, illustrative embodiments provide technical solutions which formulate programmatically and with a high degree of accuracy, the detection of anomalies in microservice behavior to indicate an upcoming and/or potential issue with a system hosting the microservice. By utilizing historical microservices metrics (e.g., response time, latency and host infrastructure metrics) corresponding to normal situations and leveraging a sophisticated machine learning algorithm, behavioral anomalies of the microservices and their hosting infrastructure are detected when the metrics deviate from normal values and exceed a dynamic, configurable threshold.

As an additional advantage, illustrative embodiments implement a smart ambassador (e.g., state designation and routing engine) that tracks the state (e.g., normal or anomalous) of microservice instances, and utilizes an enhanced circuit breaker pattern to automatically route microservice requests to a pool of available microservice instances. The smart ambassador is advantageously configured to remove microservice instances in anomalous states from the pool of available microservice instances and direct microservice requests to remaining microservice instances in pool that are operating normally. As a result, underlying issues are seamlessly handled without impacting consumers.

The smart ambassador is further configured to trigger the creation of a new instance of a microservice upon detection of an anomalous instance of the microservice. For example, the smart ambassador can invoke a function of a cloud orchestration tool to create a microservice instance in a different container and/or host devices, such that the pool of available microservice instances is increased.

Technical problems exist with conventional approaches in that microservices issues, outages and errors must be addressed by the consumers of the microservices with exception handling and retrying of operations. Since the embodiments provide technical solutions which address microservice failures before they can occur, the embodiments advantageously avoid propagation of system issues to the consumers.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the anomaly detection and resolution platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an anomaly detection and resolution platform in illustrative embodiments. These and other cloud-based systems in illustrative embodiments can include object stores.

Illustrative embodiments of processing platforms will now be described in greater detail with reference to FIGS. 16 and 17. Although described in the context of system 100, these platforms may also be used to implement at least portions of other information processing systems in other embodiments.

Figure 16:
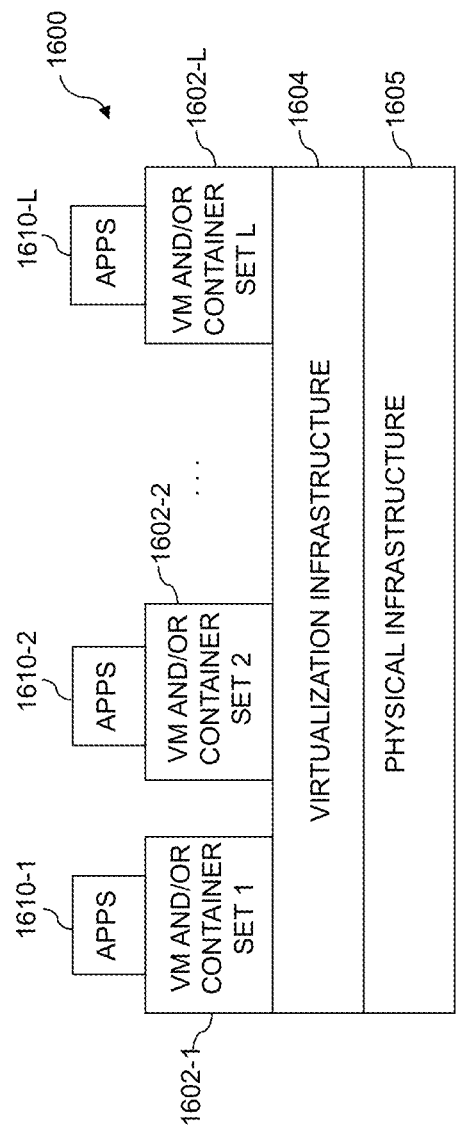
FIGS. 16 and 17 show examples of processing platforms that may be utilized to implement at least a portion of an information processing system according to illustrative embodiments.
Figure 17:
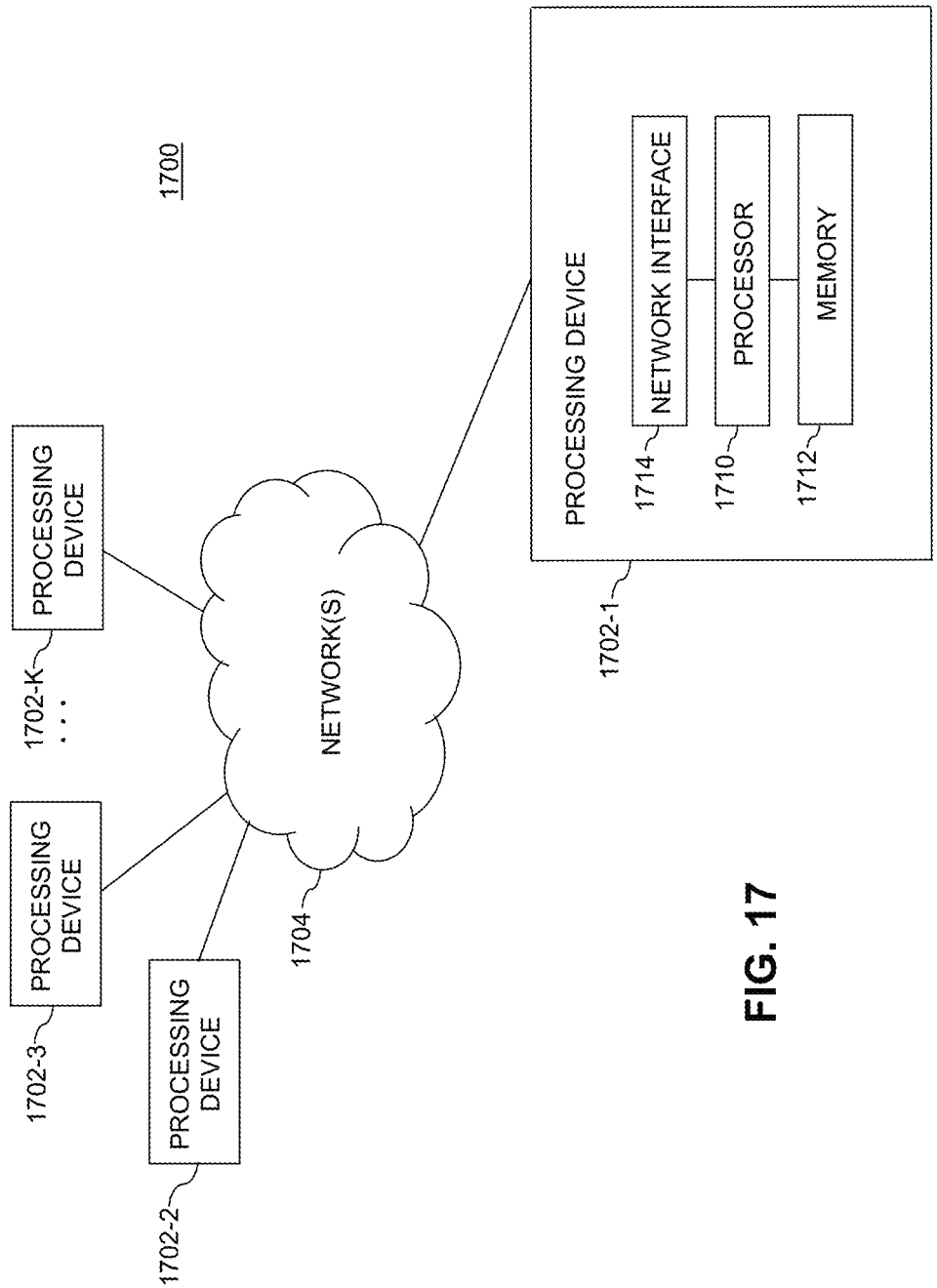

FIG. 16 shows an example processing platform comprising cloud infrastructure 1600. The cloud infrastructure 1600 comprises a combination of physical and virtual processing resources that may be utilized to implement at least a portion of the information processing system 100. The cloud infrastructure 1600 comprises multiple virtual machines (VMs) and/or container sets 1602-1, 1602-2, . . . 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, . . . 1610-L running on respective ones of the VMs/container sets 1602-1, 1602-2, . . . 1602-L under the control of the virtualization infrastructure 1604. The VMs/container sets 1602 may comprise respective VMs, respective sets of one or more containers, or respective sets of one or more containers running in VMs.

In some implementations of the FIG. 16 embodiment, the VMs/container sets 1602 comprise respective VMs implemented using virtualization infrastructure 1604 that comprises at least one hypervisor. A hypervisor platform may be used to implement a hypervisor within the virtualization infrastructure 1604, where the hypervisor platform has an associated virtual infrastructure management system. The underlying physical machines may comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, . . . 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1702-1 in the processing platform 1700 comprises a processor 1710 coupled to a memory 1712. The processor 1710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1712 may comprise random access memory (RAM), read-only memory (ROM), flash memory or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the anomaly detection and resolution platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and anomaly detection and resolution platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   collecting parameters corresponding to at least one microservice operation processed by a first instance of a microservice;
   analyzing the parameters using one or more machine learning algorithms;
   predicting, based at least in part on the analyzing, whether the at least one microservice operation is anomalous;
   designating the first instance of the microservice as being in an anomalous state responsive to predicting that the at least one microservice operation is anomalous;
   routing one or more microservice requests for the microservice to a second instance of the microservice responsive to the anomalous state designation; and
   verifying the anomalous state designation of the first instance of the microservice, wherein the verifying comprises:
   routing at least one microservice request to the first instance of the microservice instead of the second instance of the microservice;
   analyzing additional parameters corresponding to processing by the first instance of the microservice of a microservice operation associated with the at least one microservice request using the one or more machine learning algorithms; and
   predicting, based at least in part on the analyzing, whether the microservice operation associated with the at least one microservice request is anomalous;
   wherein the steps of the method are executed by a processing device operatively coupled to a memory.

2. The method of claim 1 further comprising determining whether a threshold number of microservice operations of a plurality of microservice operations processed by the first instance of the microservice have been predicted as anomalous before designating the first instance of the microservice as being in an anomalous state.

3. The method of claim 2 wherein the threshold number of microservice operations comprises a consecutive number of microservice operations processed by the first instance of the microservice.

4. The method of claim 1 wherein the parameters and the additional parameters comprise at least one of a microservice identifier, a request time of the at least one microservice operation, a response time of the at least one microservice operation and latency of the at least one microservice operation.

5. The method of claim 1 wherein the parameters and the additional parameters comprise at least one of central processing unit utilization, memory utilization and storage utilization of at least one host component hosting the first instance of the microservice.

6. The method of claim 5 wherein the at least one host component comprises a container.

7. The method of claim 1 wherein the first instance of the microservice is hosted in a first container and the second instance of the microservice is hosted in a second container.

8. The method of claim 7 wherein the first container is a component of a first host device and the second container is a component of a second host device.

9. The method of claim 7 further comprising creating the second instance of the microservice in the second container.

10. The method of claim 1 wherein the one or more machine learning algorithms utilize an unsupervised learning technique to detect one or more outlier parameters of the parameters and of the additional parameters.

11. The method of claim 10 wherein the one or more machine learning algorithms comprise an isolation forest algorithm.

12. The method of claim 10 further comprising training the one or more machine learning algorithms with training data comprising historical parameter data.

13. The method of claim 1, wherein the verifying further comprises:
collecting the additional parameters corresponding to the processing by the first instance of the microservice of the microservice operation associated with the at least one microservice request.

14. The method of claim 13 further comprising:
maintaining the anomalous state designation of the first instance of the microservice responsive to predicting that the microservice operation associated with the at least one microservice request is anomalous; and
changing the anomalous state designation of the first instance of the microservice to a normal state designation responsive to predicting that the microservice operation associated with the at least one microservice request is not anomalous.

15. The method of claim 14 further comprising routing subsequent microservice requests for the microservice to the first instance of the microservice responsive to the normal state designation.

16. An apparatus comprising:
a processing device operatively coupled to a memory and configured:
to collect parameters corresponding to at least one microservice operation processed by a first instance of a microservice;
to analyze the parameters using one or more machine learning algorithms;
to predict, based at least in part on the analyzing, whether the at least one microservice operation is anomalous;
to designate the first instance of the microservice as being in an anomalous state responsive to predicting that the at least one microservice operation is anomalous;
to route one or more microservice requests for the microservice to a second instance of the microservice responsive to the anomalous state designation; and
to verify the anomalous state designation of the first instance of the microservice, wherein verifying comprises:
routing at least one microservice request to the first instance of the microservice instead of the second instance of the microservice;
analyzing additional parameters corresponding to processing by the first instance of the microservice of a microservice operation associated with the at least one microservice request using the one or more machine learning algorithms; and
predicting, based at least in part on the analyzing, whether the microservice operation associated with the at least one microservice request is anomalous.

17. The apparatus of claim 16 wherein the first instance of the microservice is hosted in a first container and the second instance of the microservice is hosted in a second container.

18. The apparatus of claim 17 wherein the processing device is further configured to create the second instance of the microservice in the second container.

19. An article of manufacture comprising a non-transitory processor-readable storage medium having stored therein program code of one or more software programs, wherein the program code when executed by at least one processing device causes said at least one processing device to perform the steps of:
collecting parameters corresponding to at least one microservice operation processed by a first instance of a microservice;
analyzing the parameters using one or more machine learning algorithms;
predicting, based at least in part on the analyzing, whether the at least one microservice operation is anomalous;
designating the first instance of the microservice as being in an anomalous state responsive to predicting that the at least one microservice operation is anomalous;
routing one or more microservice requests for the microservice to a second instance of the microservice responsive to the anomalous state designation; and
verifying the anomalous state designation of the first instance of the microservice, wherein the verifying comprises:
routing at least one microservice request to the first instance of the microservice instead of the second instance of the microservice;
analyzing additional parameters corresponding to processing by the first instance of the microservice of a microservice operation associated with the at least one microservice request using the one or more machine learning algorithms; and
predicting, based at least in part on the analyzing, whether the microservice operation associated with the at least one microservice request is anomalous.

20. The article of manufacture of claim 19 wherein the first instance of the microservice is hosted in a first container and the second instance of the microservice is hosted in a second container.

* * * * *